US012785562B2

(12) United States Patent
Shin

(10) Patent No.: US 12,785,562 B2
(45) Date of Patent: Nov. 3, 2026

(54) BUCK CONVERTER AND ELECTRONIC DEVICE INCLUDING THE SAME

(71) Applicant: Samsung Electronics Co., Ltd., Suwon-si (KR)

(72) Inventor: Hongseok Shin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 130 days.

(21) Appl. No.: 18/910,472

(22) Filed: Oct. 9, 2024

(65) Prior Publication Data

US 2025/0226747 A1 Jul. 10, 2025

(30) Foreign Application Priority Data

Jan. 4, 2024 (KR) ........................ 10-2024-0001453
Mar. 13, 2024 (KR) ........................ 10-2024-0034865

(51) Int. Cl.

| | |
|---|---|
| ***H02M 3/158*** | (2006.01) |
| ***H02M 1/00*** | (2006.01) |
| ***H02M 1/08*** | (2006.01) |
| ***H02M 1/12*** | (2006.01) |
| ***H02M 1/32*** | (2007.01) |
| ***H02M 3/156*** | (2006.01) |

(52) U.S. Cl.

CPC ......... *H02M 3/158* (2013.01); *H02M 1/0032* (2021.05); *H02M 1/08* (2013.01); *H02M 1/126* (2013.01); *H02M 1/32* (2013.01); *H02M 3/156* (2013.01)

(58) Field of Classification Search

CPC .............................. H02M 3/156; H02M 3/158
See application file for complete search history.

(56) References Cited

U.S. PATENT DOCUMENTS

| | | | | |
|---|---|---|---|---|
| 7,782,036 | B1 | 8/2010 | Wong et al. | |
| 8,941,367 | B2 * | 1/2015 | Li | G05F 1/46 323/288 |
| 9,030,177 | B2 | 5/2015 | Nakashima | |
| 9,280,163 | B2 | 3/2016 | Kay et al. | |
| 10,931,196 | B2 | 2/2021 | Guo | |
| 11,183,928 | B2 * | 11/2021 | Cao | H02M 3/156 |
| 11,456,667 | B2 | 9/2022 | Zhang et al. | |
| 11,682,969 | B2 | 6/2023 | Zhang et al. | |
| 2015/0280557 | A1 * | 10/2015 | Xue | H02M 3/156 323/271 |
| 2018/0048232 | A1 * | 2/2018 | Adell | H02M 3/158 |
| 2018/0123450 | A1 * | 5/2018 | Moon | H02M 3/04 |
| 2022/0294330 | A1 * | 9/2022 | Huang | H02M 1/0009 |

* cited by examiner

*Primary Examiner* — Gary A Nash
(74) *Attorney, Agent, or Firm* — Fish & Richardson P.C.

(57) ABSTRACT

A buck converter generates an output voltage from an input voltage in response to a switching signal, compares the output voltage with a reference voltage during an activation time interval of the switching signal, and compares a sum of the output voltage and a voltage reflecting a current flowing through an inductor with the reference voltage during a deactivation time interval of the switching signal. Accurate output voltage is generated and a fast transient response characteristic is obtained even if a load current changes.

20 Claims, 11 Drawing Sheets

100

BUCK CONVERTER AND ELECTRONIC DEVICE INCLUDING THE SAME

CROSS-REFERENCE TO RELATED APPLICATIONS

This application claims priority under 35 USC § 119 to Korean Patent Application No. 10-2024-0001453 filed on Jan. 4, 2024 and to Korean Patent Application No. 10-2024-0034865 filed on Mar. 13, 2024 in the Korean Intellectual Property Office (KIPO), the contents of which are herein incorporated by reference in their entirety.

BACKGROUND

Some example embodiments relate generally to voltage converters, and more particularly to buck converters configured to generate accurate and stable output voltages, and electronic devices including the buck converters.

Electronic devices may include a variety of semiconductor devices, and each of the semiconductor devices may require an appropriate direct current (DC) voltage. Electronic devices may also include a semiconductor device, which is referred to as a power management integrated chip (PMIC), for generating a DC voltage required by each semiconductor device. The PMIC may include at least one DC-DC converter that generates an output DC voltage desired by at least one semiconductor device based on an input DC voltage. A buck converter (e.g., a switching regulator), which is a type of DC-DC converter, may generate an output voltage having a voltage level lower than that of an input voltage. Research has been conducted to improve the accuracy of output voltage regardless of a load current and to improve the transient response characteristic when the load current changes.

SUMMARY

Some example embodiments of the present disclosure provide a buck converter capable of improving the accuracy of output voltage regardless of a load current and generating stable output voltage within a relatively short period of time even if the load current changes rapidly.

Some example embodiments of the present disclosure provide an electronic device including the buck converter.

Some example embodiments provide a buck converter that includes a power switching circuit, a low pass filter, a first resistor, a capacitor, a switch, a comparator and an SR latch. The power switching circuit alternately transfers an input voltage and a ground voltage to an output terminal based on a switching signal. The low pass filter includes an inductor, the inductor having a first end connected to the output terminal and a second end connected to a load capacitor, and the inductor generates an output voltage at the second end. The first resistor and the capacitor are connected in series between the output terminal and the second end of the inductor. The switch is between a common node and the second end of the inductor. The common node is connected to the first resistor and the capacitor. The comparator generates a comparison signal by comparing a sensing voltage at the common node with a reference voltage. The SR latch receives the comparison signal as a set signal, receives a delay signal as a reset signal, and generates the switching signal based on the comparison signal and the delay signal. The delay signal is activated after the comparison signal is activated. The switch electrically connects the common node and the second end of the inductor during an activation time interval of the switching signal.

Some example embodiments further provide a buck converter that includes a power switching circuit, a low pass filter, a first resistor, a first capacitor, a switch, a first comparator, a delay circuit and a first SR latch. The power switching circuit alternately transfers an input voltage and a ground voltage to an output terminal based on a switching signal. The low pass filter includes an inductor, the inductor having a first end connected to the output terminal and a second end connected to a load capacitor, and the inductor generates an output voltage at the second end. The first resistor and the first capacitor are connected in series between the output terminal and the second end of the inductor. The switch is between a common node and the second end of the inductor. The common node is connected to the first resistor and the first capacitor. The first comparator generates a first comparison signal by comparing a sensing voltage at the common node with a first reference voltage. The delay circuit generates a delay signal by delaying the first comparison signal. The first SR latch receives the first comparison signal as a set signal, receives the delay signal as a reset signal, and generates the switching signal based on the first comparison signal and the delay signal. The first SR latch activates the switching signal when the first comparison signal is activated and deactivates the switching signal when the delay signal is activated. The switch electrically connects the common node and the second end of the inductor during an activation time interval of the switching signal, and electrically disconnects the common node and the second end of the inductor during a deactivation time interval of the switching signal.

Some example embodiments still further provide an electronic device that includes a first semiconductor chip, an inductor, a load capacitor and a second semiconductor chip. The first semiconductor chip includes a power switching circuit, a sensing voltage generator and a switching signal generator. The power switching circuit alternately transfers an input voltage and a ground voltage to an output terminal based on a switching signal having an activation time interval and a deactivation time interval. The sensing voltage generator generates a sensing voltage. The switching signal generator generates the switching signal based on the sensing voltage. The inductor and the load capacitor generate an output voltage by low-pass filtering a voltage at the output terminal. The second semiconductor chip receives the output voltage as a power supply voltage. During the activation time interval of the switching signal, the sensing voltage generator generates the sensing voltage as being equal to the output voltage. During the deactivation time interval of the switching signal, the sensing voltage generator generates the sensing voltage as being equal to a sum of the output voltage and a voltage reflecting a current flowing through the output terminal.

In the buck converter according to some example embodiments, accurate and stable output voltage may be generated regardless of load current, and stable output voltage may be generated within a short period of time even if the load current changes rapidly. Accordingly, overall performance of the buck converter may be improved or enhanced.

In the electronic device including the buck converter according to some example embodiments, accurate and stable output voltage may be provided from the buck converter to the load device. Accordingly, the performance of the electronic device may be ensured consistently regardless of load current.

BRIEF DESCRIPTION OF THE DRAWINGS

Illustrative, non-limiting example embodiments will be more clearly understood from the following detailed description taken in conjunction with the accompanying drawings.

DETAILED DESCRIPTION

Figure 1:
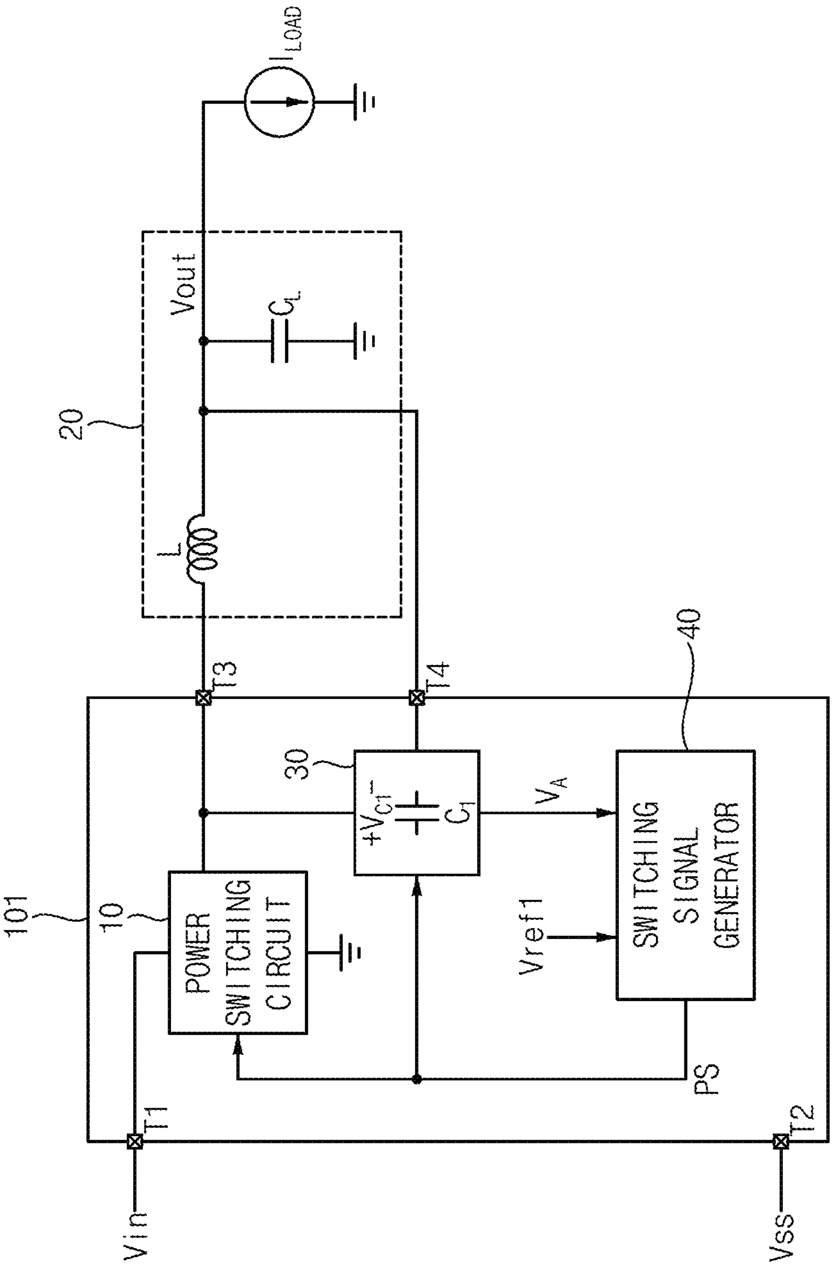
FIG. 1 is a block diagram illustrating a DC-DC converter according to some example embodiments.

Some example embodiments will be described more fully with reference to the accompanying drawings. The present disclosure may, however, be embodied in many different forms and should not be construed as limited to the embodiments set forth herein. Like reference numerals refer to like elements throughout this application.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes. When ranges are in specified, the range includes all values therebetween such as increments of 0.1%.

Also, for example, "at least one of A, B, and C" and similar language (e.g., "at least one selected from the group consisting of A, B, and C") may be construed as A only, B only, C only, or any combination of two or more of A, B, and C, such as, for instance, ABC, AB, BC, and AC.

FIG. 1 is a block diagram illustrating a DC-DC converter according to some example embodiments.

Referring to FIG. 1, a DC-DC converter 100 may include a semiconductor chip 101 and a low pass filter (or LC filter) 20. For example, the semiconductor chip 101 and the low pass filter 20 may be mounted on a printed circuit board (PCB) (not illustrated). For example, the DC-DC converter 100 may be electrically connected to a load device (not illustrated) that consumes a load current $I_{LOAD}$, and may supply the load current $I_{LOAD}$ to the load device. For example, the DC-DC converter 100 may be a buck converter that generates an output voltage Vout by reducing an input voltage Vin using the semiconductor chip 101 and the low pass filter 20, and a voltage level of the output voltage Vout may be lower than a voltage level of the input voltage Vin. A detailed configuration of the buck converter will be described with reference to FIG. 2.

The semiconductor chip 101 may include input terminals T1 and T2, an output terminal T3, a feedback terminal T4, a power switching circuit 10, a sensing voltage generator 30 and a switching signal generator 40.

The input terminals T1 and T2 may supply an input voltage Vin and a ground voltage Vss, respectively, to the semiconductor chip 101. The power switching circuit 10 may alternately transfer (or transmit) the input voltage Vin and the ground voltage Vss to the output terminal T3 in response to a switching signal PS. For example, the switching signal PS may be a pulse signal including an activation time interval and a deactivation time interval that are repeatedly arranged.

The sensing voltage generator 30 may include a capacitor $C_1$, and may generate a sensing voltage (or detection voltage) $V_A$ based on the switching signal PS, a voltage $V_{C1}$ across the capacitor $C_1$ and the output voltage Vout. The voltage $V_{C1}$ across the capacitor $C_1$ may be obtained by reflecting a current flowing through the output terminal T3, and may be referred to as a capacitor voltage. The output voltage Vout may be received through the feedback terminal T4. For example, the current flowing through the output terminal T3 may be substantially equal to or the same as an inductor current (e.g., an inductor current $I_L$ in FIG. 2) flowing through an inductor L included in the low pass filter 20. For example, the current flowing through the output terminal T3 may include a direct current (DC) component of the load current $I_{LOAD}$ and an alternating current (AC) component of a coupling current generated on the switching signal PS.

The switching signal generator 40 may generate the switching signal PS by comparing the sensing voltage $V_A$ with a first reference voltage Vref1. The switching signal PS generated by the switching signal generator 40 may be activated when the sensing voltage $V_A$ is equal to or lower than the first reference voltage Vref1, may maintain an activation state for a desired (and/or alternatively predetermined) time interval, and then may be deactivated. For example, the desired (and/or alternatively predetermined) time interval for which the switching signal PS maintains the activation state may be determined by a delay circuit D1 in FIG. 2.

Hereinafter, activating a signal may represent that the signal is transitioned from a logic low level to a logic high level, and deactivating a signal may represent that the signal is transitioned from a logic high level to a logic low level. However, some example embodiments are not limited thereto. In some example embodiments, activating a signal may represent that the signal is transitioned from a logic high level to a logic low level, and deactivating a signal may represent that the signal is transitioned from a logic low level to a logic high level.

The sensing voltage generator 30 may output the output voltage Vout as the sensing voltage $V_A$ during the activation time interval of the switching signal PS (or while the switching signal PS is activated), and may output the sum of the output voltage Vout and the voltage $V_{C1}$ across the capacitor $C_1$ as the sensing voltage $V_A$ during the deactivation time interval of the switching signal PS (or while the switching signal PS is deactivated). The power switching circuit 10 may transfer the input voltage Vin to the output terminal T3 during the activation time interval of the switching signal PS, and may transfer the ground voltage Vss to the output terminal T3 during the deactivation time interval of the switching signal PS.

The low pass filter 20 may include the inductor L and a load capacitor $C_L$, may generate the output voltage Vout by smoothing the voltage transferred to the output terminal T3, and may transfer the output voltage Vout to the load device.

In the DC-DC converter 100 according to some example embodiments, the voltage $V_{C1}$ across the capacitor $C_1$ may be reset during the activation time interval of the switching signal PS, and the change in the voltage $V_{C1}$ across the capacitor $C_1$ due to the DC component of the inductor current $I_L$ may be limited and/or prevented or suppressed. Accordingly, the sensing voltage $V_A$ generated based on the voltage $V_{C1}$ across the capacitor $C_1$ may accurately reflect the state of the output voltage Vout, and the accuracy of the output voltage Vout depending on the load current $I_{LOAD}$ may be improved or enhanced. The output voltage Vout may be stabilized within a relatively fast response time even if the load current $I_{LOAD}$ changes rapidly.

Figure 2:
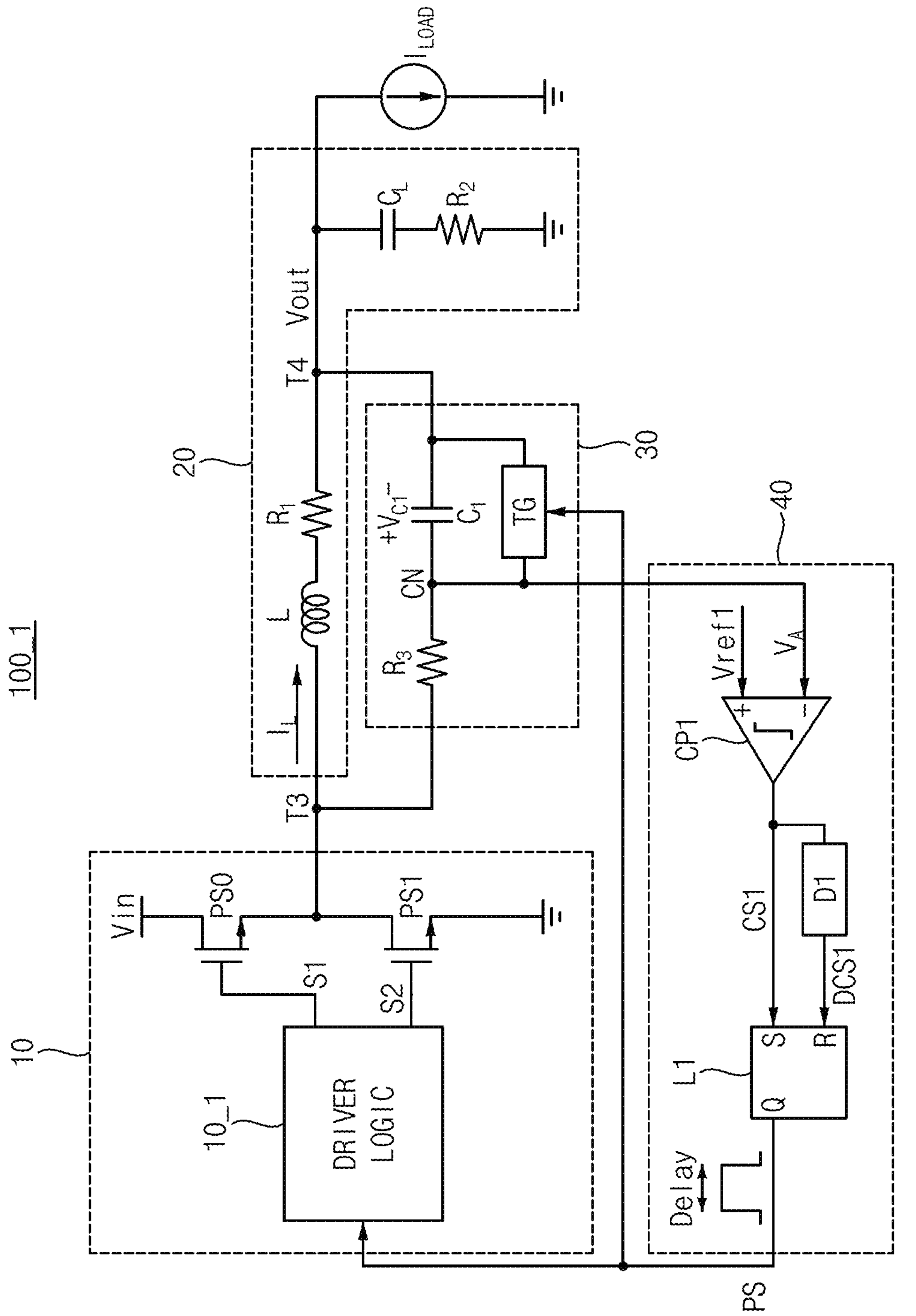
FIG. 2 is a circuit diagram illustrating a buck converter according to some example embodiments.

FIG. 2 is a circuit diagram illustrating a buck converter according to some example embodiments.

Referring to FIG. 2, a buck converter 100_1 may include the power switching circuit 10, the low pass filter 20, the sensing voltage generator 30 and the switching signal generator 40.

The buck converter 100_1 may be an example of the DC-DC converter 100 of FIG. 1. For example, the DC-DC converter according to some example embodiments may be a buck converter. As compared with FIG. 1, like reference numerals refer to like elements. The descriptions repeated with or overlapping with descriptions of FIG. 1 will be omitted in the interest of brevity.

The power switching circuit 10 may include a driving circuit 10_1, a first power switch PS0 and a second power switch PS1.

The driving circuit 10_1 may generate a signal S1 and a signal S2 in response to the switching signal PS. The signal S1 may be used for turning on the first power switch PS0 during the activation time interval of the switching signal PS, and the signal S2 may be used for turning on the second power switch PS1 during the deactivation time interval of the switching signal PS.

The first power switch PS0 may be turned on during the activation time interval of the switching signal PS in response to the signal S1, and may transfer the input voltage Vin to the output terminal T3. The second power switch PS1 may be turned on during the deactivation time interval of the switching signal PS in response to the signal S2, and may transfer the ground voltage Vss to the output terminal T3. In FIG. 2 and subsequent figures, three parallel straight lines with different lengths connected to the second power switch PS1 may represent the ground voltage Vss.

Although FIG. 2 illustrates that the first and second power switches PS0 and PS1 are n-type metal oxide semiconductor (NMOS) transistors, some example embodiments are not limited thereto. For example, the first power switch PS0 may be replaced with a p-type metal oxide semiconductor (PMOS) transistor.

The low pass filter 20 may include the inductor L and the load capacitor $C_L$. For example, the inductor L may be modeled to include a first resistor $R_1$ connected in series with the inductor L, and the load capacitor $C_L$ may be modeled to include a second resistor $R_2$ connected in series with the load capacitor $C_L$.

The first resistor $R_1$ may be a modeling element of a direct current resistor (DCR) of a coil constituting the inductor (L). The second resistor $R_2$ may be a modeling element of an equivalent series resistor (ESR) inside a dielectric constituting the load capacitor $C_L$. The first resistor $R_1$ and the second resistor $R_2$ may not be included in real products (e.g., the first resistor $R_1$ and the second resistor $R_2$ may be parasitic components). Since a resistance of the first resistor $R_1$ is used to determine the voltage VC1 across the capacitor $C_1$ in the sensing voltage generator 30, the first resistor $R_1$ may be illustrated in FIG. 2.

Hereinafter, the first resistor $R_1$ will be described as to not exist when describing a physical connection of the inductor L in the buck converter 100_1. For example, a first end (or one end) of the inductor L may be connected to the output terminal T3, and a second end (or the other end) of the inductor L may be connected to one end of the load capacitor $C_L$ to provide the output voltage Vout to the load device.

The sensing voltage generator 30 may include a third resistor $R_3$, the capacitor $C_1$ and a switch TG.

The third resistor $R_3$ and the capacitor $C_1$ may be connected in series between the output terminal T3 and the second end of the inductor L, and may form an RC filter. The voltage $V_{C1}$ reflecting the current flowing through the inductor L may be stored in the capacitor $C_1$. For example, the third resistor $R_3$ and the capacitor $C_1$ connected in series may be connected in parallel with the inductor L. For example, the voltage $V_{C1}$ across the capacitor $C_1$ may be obtained based on Equation 1.

$$V_{C1} = \frac{I_L R_1\left(1 + s\frac{L}{R_1}\right)}{(1 + sR_3C_1)} \quad \text{[Equation 1]}$$

In Equation 1, $V_{C1}$ denotes the voltage across the capacitor $C_1$, $I_L$ denotes the inductor current flowing through the inductor L, $R_1$ denotes the resistance of first resistor $R_1$ (e.g., the equivalent series resistor, the modeling resistor or the parasitic resistor connected in series with the inductor L), s denotes the Laplace variable, L denotes an inductance of the inductor L, $R_3$ denotes a resistance of the third resistor $R_3$, and $C_1$ denotes a capacitance of the capacitor $C_1$. If a value of $L/R_1$ and a value of $R_3C_1$ are selected to be the same value, the voltage $V_{C1}$ across the capacitor $C_1$ may be proportional to the inductor current $I_L$.

The switch TG may be disposed or located between the second end of the inductor L and a common node CN, the common node CN being commonly connected to the third resistor $R_3$ and the capacitor $C_1$. The switch TG may electrically connect or disconnect the common node CN and the second end of the inductor L in response to the switching signal PS. For example, the switch TG may include a transmission gate.

The switching signal generator 40 may include a comparator CP1, a delay circuit D1, and a first SR latch L1.

The comparator CP1 may generate or output a comparison signal CS1 by comparing the sensing voltage $V_A$ at the common node CN with the first reference voltage Vref1. For example, the comparison signal CS1 may be activated when the sensing voltage $V_A$ is equal to or less than the first reference voltage Vref1, and may be deactivated when the sensing voltage $V_A$ is higher than the first reference voltage Vref1.

The delay circuit D1 may generate a delay signal DCS1 that is activated after the comparison signal CS1 is activated.

The first SR latch L1 may receive the comparison signal CS1 as a set signal, may receive the delay signal DCS1 as a reset signal, and may generate the switching signal PS based on the comparison signal CS1 and the delay signal DCS1. The switching signal PS may be activated in response to the activation of the comparison signal CS1, and then may be deactivated in response to the activation of the delay signal DCS1.

In some example embodiments, the activation time interval of the switching signal PS may be determined depending on a delay time of the delay circuit D1. For example, the delay time of the delay circuit D1 may be variable or changeable during an operation of the buck converter 100_1 depending on the voltage level of the input voltage Vin and/or the voltage level of the output voltage Vout. For example, the delay time of the delay circuit D1 may be fixed regardless of the voltage level of the input voltage Vin. Detailed configurations and operations of the delay circuit D1 will be described with reference to FIGS. 6A, 6B, 7A and 7B.

The switching signal PS generated by the switching signal generator 40 may be transferred to the power switching circuit 10 and the switch TG.

During the activation time interval of the switching signal PS, the first power switch PS0 in the power switching circuit 10 may transfer the input voltage Vin to the output terminal T3 to increase the inductor current IL. During the deactivation time interval of the switching signal PS, the second power switch PS1 in the power switching circuit 10 may transfer the ground voltage Vss to the output terminal T3 to decrease the inductor current $I_L$.

During the activation time interval of the switching signal PS, the switch TG may electrically connect the common node CN and the second end of the inductor L, may reset the voltage $V_{C1}$ across the capacitor $C_1$ by the inductor current $I_L$, and may maintain the voltage $V_{C1}$ across the capacitor $C_1$ at about 0V. Therefore, during the activation time interval of the switching signal PS, the sensing voltage $V_A$ may be substantially equal to the output voltage Vout (e.g., $V_A$=Vout). During the deactivation time interval of the switching signal PS, the switch TG may electrically disconnect the common node CN and the second end of the inductor L. Therefore, during deactivation time interval of the switching signal PS, the sensing voltage $V_A$ may be obtained as the sum of the voltage $V_{C1}$ across the capacitor $C_1$ and the output voltage Vout (e.g. $V_A$=Vout+$V_{C1}$).

The buck converter 100_1 may remove the DC component of the inductor current $I_L$ by resetting the voltage $V_{C1}$ across the capacitor $C_1$ during the activation time interval of the switching signal PS, and thus the accuracy of the output voltage Vout may be increased by accurately reflecting the state of the output voltage Vout on the sensing voltage $V_A$. For example, the accuracy of the output voltage Vout may be increased in a continuous current mode (CCM) in which a relatively large load current is consumed in the load device, and/or in a discontinuous current mode (DCM) in which a relatively small load current is consumed in the load device.

The buck converter 100_1 may compare the voltage $V_{C1}$ across the capacitor $C_1$, which is obtained by reflecting the output voltage Vout and the inductor current $I_L$, with the first reference voltage Vref1 during the deactivation time interval of the switching signal PS, and thus the output voltage Vout may be stably generated within a relatively short period of time even if the load current $I_{LOAD}$ changes rapidly.

Hereinafter, the operation of the buck converter 100_1 of FIG. 2 in various operating states will be described with reference to FIGS. 3, 4 and 5.

Figure 3:
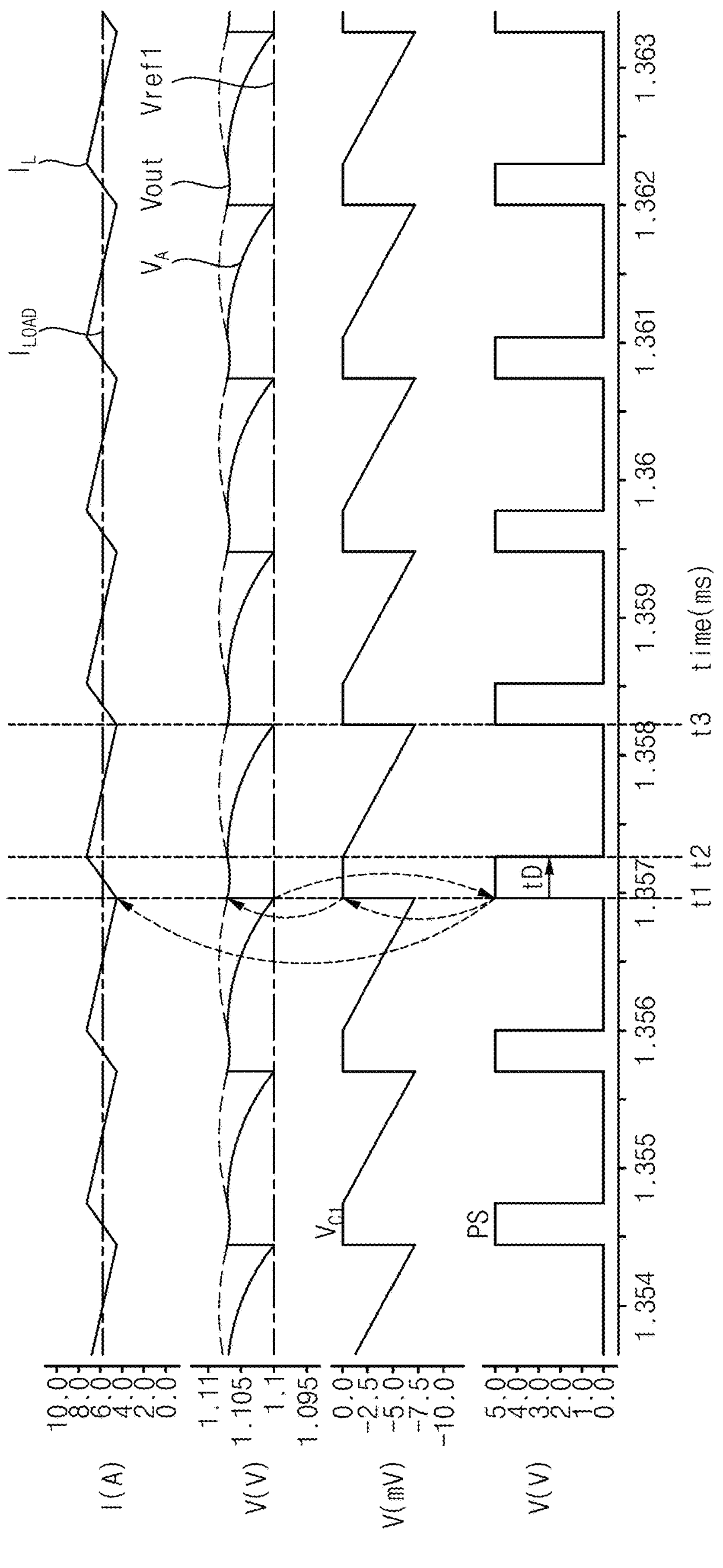
FIG. 3 is a timing diagram illustrating an operation of a buck converter of FIG. 2 in a steady state with a constant load current.

FIG. 3 is a timing diagram illustrating an operation of the buck converter 100_1 of FIG. 2 in a steady state with a constant load current.

Referring to FIG. 3, an example of the load current $I_{LOAD}$, the inductor current $I_L$, the first reference voltage Vref1, the sensing voltage $V_A$, the output voltage Vout, the voltage $V_{C1}$ across the capacitor $C_1$ and the switching signal PS in FIG. 2 is illustrated. The operation of the buck converter according to some example embodiments will be described with reference to FIGS. 2 and 3.

The comparator CP1 may compare the first reference voltage Vref1 with the sensing voltage $V_A$, and may activate the comparison signal CS1 at time point t1 when the sensing voltage $V_A$ becomes equal to the first reference voltage Vref1. The first SR latch L1 may activate the switching signal PS in response to the activated comparison signal CS1, may maintain the activation state of the switching signal PS during a delay time tD, and may deactivate the switching signal PS in response to the delay signal DCS1 after the delay time tD elapses from time point t1.

The switch TG may electrically connect the common node CN and the second end of the inductor L in response to the activated switching signal PS, may reset the voltage $V_{C1}$ across the capacitor $C_1$ to about 0V, and may maintain the voltage $V_{C1}$ across the capacitor $C_1$ at about 0V during the delay time tD, which is a time interval during which the switching signal PS is activated. For example, during the activation time interval (e.g., from time point t1 to time point t2) of the switching signal PS, the sensing voltage $V_A$ may have a voltage level substantially equal to that of the output voltage Vout (e.g., $V_A$=Vout).

During the deactivation time interval (e.g., from time point t2 to time point t3) of the switching signal PS, the switch TG may electrically disconnect the common node CN and the second end of the inductor L in response to the deactivated switching signal PS, and the voltage $V_{C1}$ across the capacitor $C_1$ may be lower than about 0V as the inductor current $I_L$ decreases and may be expressed as Equation 1. For example, during the deactivation time interval of the switching signal PS, the sensing voltage $V_A$ may have a voltage level substantially equal to that of the sum of the voltage $V_{C1}$ across the capacitor $C_1$ and the output voltage Vout (e.g., $V_A$=Vout+$V_{C1}$).

As the voltage $V_{C1}$ across the capacitor $C_1$ decreases, the sensing voltage $V_A$ may decrease. At time point t3 at which the sensing voltage $V_A$ is equal to the first reference voltage Vref1, the comparator CP1 may activate the switching signal PS again.

During the activation time interval (e.g., from time point t1 to time point t2) of the switching signal PS, the power switching circuit 10 may turn on the first power switch PS0 to apply the input voltage Vin to the output terminal T3, and may increase the inductor current $I_L$ flowing through the inductor L to increase the output voltage Vout. During the deactivation time interval (e.g., from time point t2 to time point t3) of the switching signal PS, the power switching circuit 10 may turn on the second power switch PS1 to apply the ground voltage Vss to the output terminal T3, and may decrease the inductor current $I_L$ flowing through the inductor L to decrease the output voltage Vout.

Figure 4:
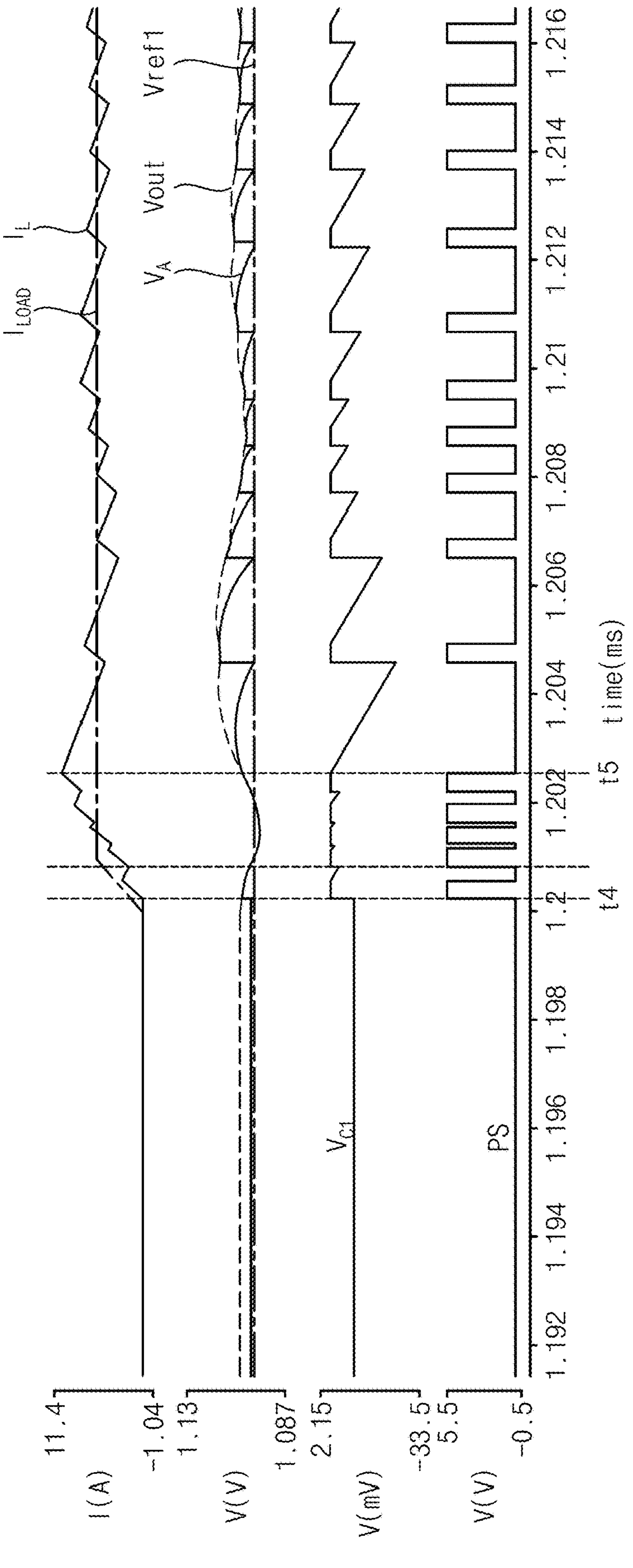
FIG. 4 is a timing diagram illustrating an operation of a buck converter of FIG. 2 in a state transitioning from a small load current to a large load current.

FIG. 4 is a timing diagram illustrating an operation of the buck converter 100_1 of FIG. 2 in a state transitioning from a small load current to a large load current.

Referring to FIG. 4, an example of the load current $I_{LOAD}$, the inductor current $I_L$, the first reference voltage Vref1, the sensing voltage $V_A$, the output voltage Vout, the voltage $V_{C1}$ across the capacitor $C_1$ and the switching signal PS in FIG. 2 is illustrated. The operation of the buck converter according to some example embodiments will be described with reference to FIGS. 2, 3 and 4.

When the load current $I_{LOAD}$ is transitioned or changed from a relatively small load current to a relatively large load current, the output voltage Vout may decrease due to the relatively large load current. The comparator CP1 may activate the comparison signal CS1 at time point t4 when the sensing voltage $V_A$ becomes equal to the first reference voltage Vref1, and the first SR latch L1 may generate the switching signal PS in the form of pulses with an activation time interval equal to the delay time tD. During a time interval from time point t4 to time point t5, the switching signal PS may be activated more frequently than the switching signal PS in the steady state of FIG. 3, thereby increasing the inductor current $I_L$ more. Therefore, the undershooting of the output voltage Vout may be limited and/or prevented, and the output voltage Vout may be stabilized within a relatively short period of time.

Figure 5:
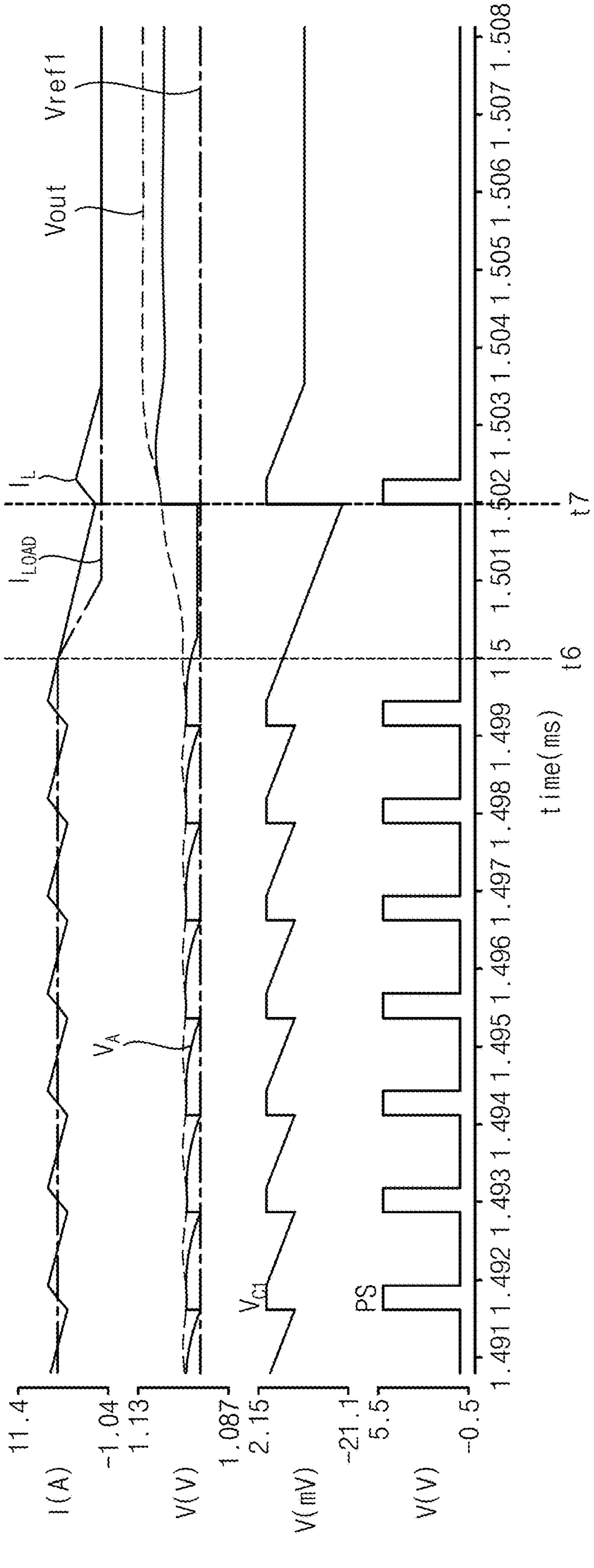
FIG. 5 is a timing diagram illustrating an operation of a buck converter of FIG. 2 in a state transitioning from a large load current to a small load current.

FIG. 5 is a timing diagram illustrating an operation of the buck converter 100_1 of FIG. 2 in a state transitioning from a large load current to a small load current.

Referring to FIG. 5, an example of the load current $I_{LOAD}$, the inductor current $I_L$, the first reference voltage Vref1, the sensing voltage $V_A$, the output voltage Vout, the voltage $V_{C1}$ across the capacitor $C_1$ and the switching signal PS in FIG. 2 is illustrated. The operation of the buck converter according to some example embodiments will be described with reference to FIGS. 2, 3 and 5.

From time point t6 when the load current $I_{LOAD}$ is transitioned or changed from a relatively large load current to a relatively small load current, the output voltage Vout may begin to increase. The comparator CP1 may activate the comparison signal CS1 at time point t7 when the sensing voltage $V_A$, which is the sum of the output voltage Vout and the voltage $V_{C1}$ across the capacitor $C_1$ during the deactivation time interval of the switching signal PS, becomes equal to the first reference voltage Vref1, and the first SR latch L1 may generate the switching signal PS in the form of a pulse with an activation time interval equal to the delay time tD. During a time interval from time point t6 to time point t7, the switching signal PS may have a longer deactivation time interval than the switching signal PS in the steady state of FIG. 3, thereby reducing the inductor current $I_L$. Therefore, the overshooting of the output voltage Vout may be limited and/or prevented, and the output voltage Vout may be stabilized within a relatively short period of time.

Figure 6A:
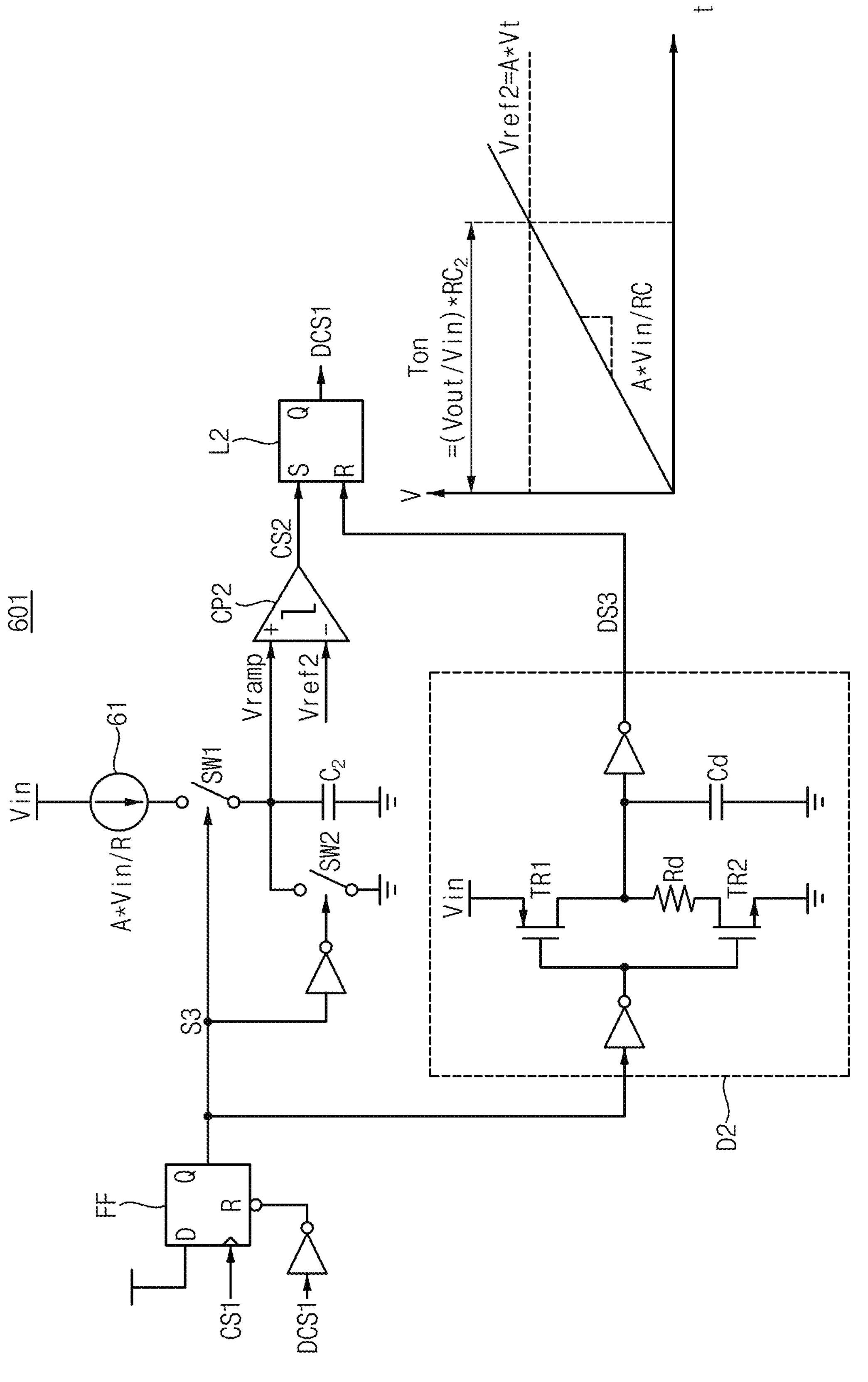
FIG. 6A is a circuit diagram illustrating an example of a delay circuit in FIG. 2.
Figure 6B:
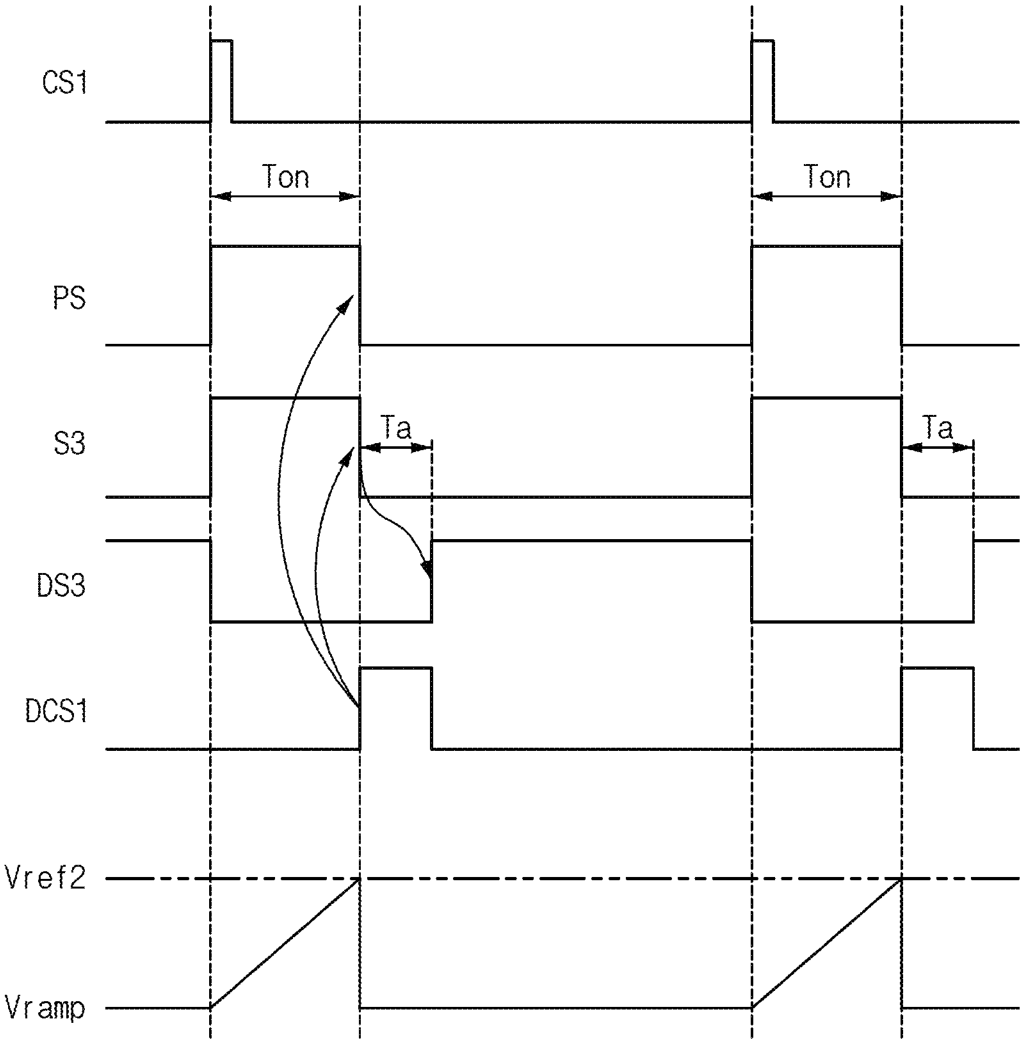
FIG. 6B is a diagram for describing an operation of a delay circuit in FIG. 2.

FIG. 6A is a circuit diagram illustrating an example of the delay circuit D1 in FIG. 2. FIG. 6B is a diagram for describing an operation of the delay circuit D1 in FIG. 2.

Referring to FIGS. 6A and 6B, a delay circuit 601 may include a flip-flop FF, a current source 61, a capacitor $C_2$, a comparator CP2, an SR latch L2 and a delay unit D2.

The flip-flop FF may generate a signal S3 based on the comparison signal CS1 and the delay signal DCS1. For example, the signal S3 may be activated when the comparison signal CS1 is activated and the switching signal PS is activated, and may be deactivated when the delay signal DCS1 is activated.

The current source 61 may generate a current of A*Vin/R that is proportional to the input voltage Vin. The capacitor $C_2$ may generate a ramp voltage Vramp by accumulating the current from current source (61) during an activation time interval of the signal S3. Switches SW1 and SW2 may be disposed between the current source 61 and the capacitor $C_2$. For example, the connection and/or disconnection of the current source 61 and the capacitor $C_2$ may be controlled by the switches SW1 and SW2 such that the current from the current source 61 is accumulated in the capacitor $C_2$ during the activation time interval of the signal S3 and the capacitor $C_2$ is discharged during a deactivation time interval of the signal S3.

The comparator CP2 may generate a comparison signal CS2 by comparing the ramp voltage Vramp with a second reference voltage Vref2. For example, the second reference voltage Vref2 may be A*Vt that is proportional to a target output voltage (Vt) of the buck converter. For example, a proportional coefficient (e.g., A) of the current source 61 to the input voltage Vin and a proportional coefficient (e.g., A) of the second reference voltage Vref2 to the target output voltage Vt may be equal to each other.

The SR latch L2 may receive the comparison signal CS2 as a set signal, and may generate the delay signal DCS1 based on the comparison signal CS2. For example, the delay signal DCS1 may be activated when the comparison signal CS2 is activated. The SR latch L1 in FIG. 2 may deactivate the switching signal PS in response to the activation of the delay signal DCS1.

The delay unit D2 may generate a signal DS3 based on the signal S3. To delay the deactivation transfer of the signal S3, the delay unit D2 may include inverters each of which includes a capacitor Cd, a resistor Rd and transistors TR1 and TR2. For example, the signal DS3 may have a phase generally opposite to that of the signal S3, a length of a deactivation time interval of the signal DS3 may increase by a time interval Ta as compared with a length of an activation time interval of the signal S3, and the time interval Ta may be determined by delay components of the capacitor Cd and the resistor Rd that are included in the delay unit D2. The signal DS3 may be input to the SR latch L2 as a reset signal, and the SR latch L2 may generate the delay signal DCS1 based on the signal DS3. For example, the SR latch L2 may deactivate the delay signal DCS1 when the signal DS3 is activated. The delay components of the capacitor Cd and the resistor Rd that are included in the delay unit D2 may ensure the minimum activation time interval Ta of the delay signal DCS1. For example, the minimum activation time interval Ta of the delay signal DCS1 may be used to ensure the minimum deactivation time interval of the switching signal PS and the minimum turn-on time interval of the second power switch PS1 included in the power switching circuit 10 of FIG. 2.

The delay time determined by the delay circuit 601 of FIG. 6A, e.g., an activation time interval Ton of the switching signal PS, may be obtained based on Equation 2.

$$Ton = (Vout/Vin) * RC2 \qquad \text{[Equation 2]}$$

In Equation 2, Ton denotes the activation time interval of the switching signal PS, Vout denotes the output voltage of the buck converter, Vin denotes the input voltage, R denotes a resistance of the current source 61, and $C_2$ denotes a capacitance of the capacitor $C_2$. The activation time interval Ton of the switching signal PS may be changed depending on the input voltage Vin, the output voltage Vout, the resistance of the current source 61, and the capacitance of the capacitor $C_2$.

As described with reference to the delay circuit 601 of FIG. 6A, a control scheme in which the activation time interval of the switching signal PS is controlled, adjusted and/or changed depending on at least the voltage level of the input voltage Vin may be referred to as an adaptive on-time (AOT) scheme.

Figure 7A:
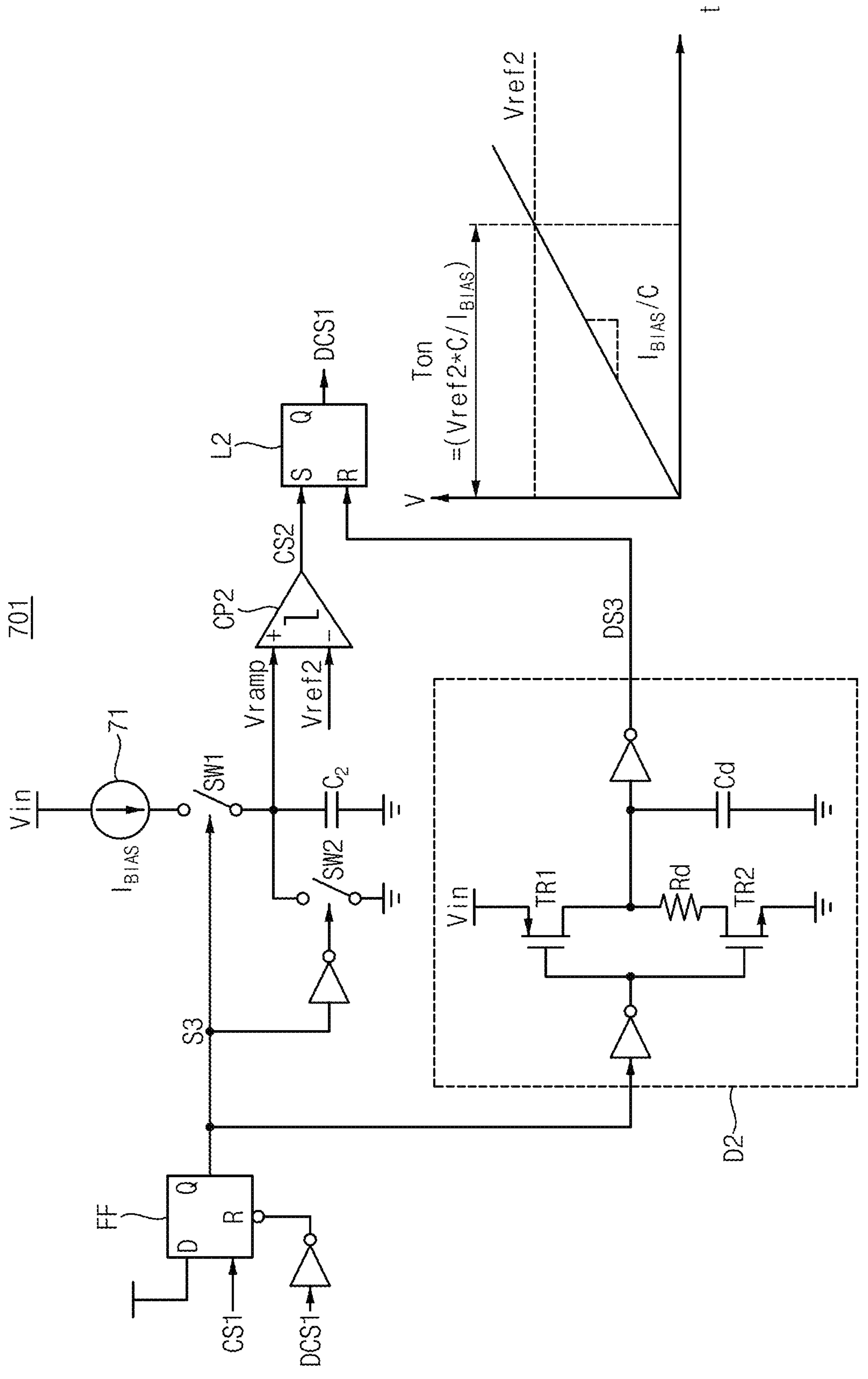
FIG. 7A is a circuit diagram illustrating an example of a delay circuit in FIG. 2.
Figure 7B:
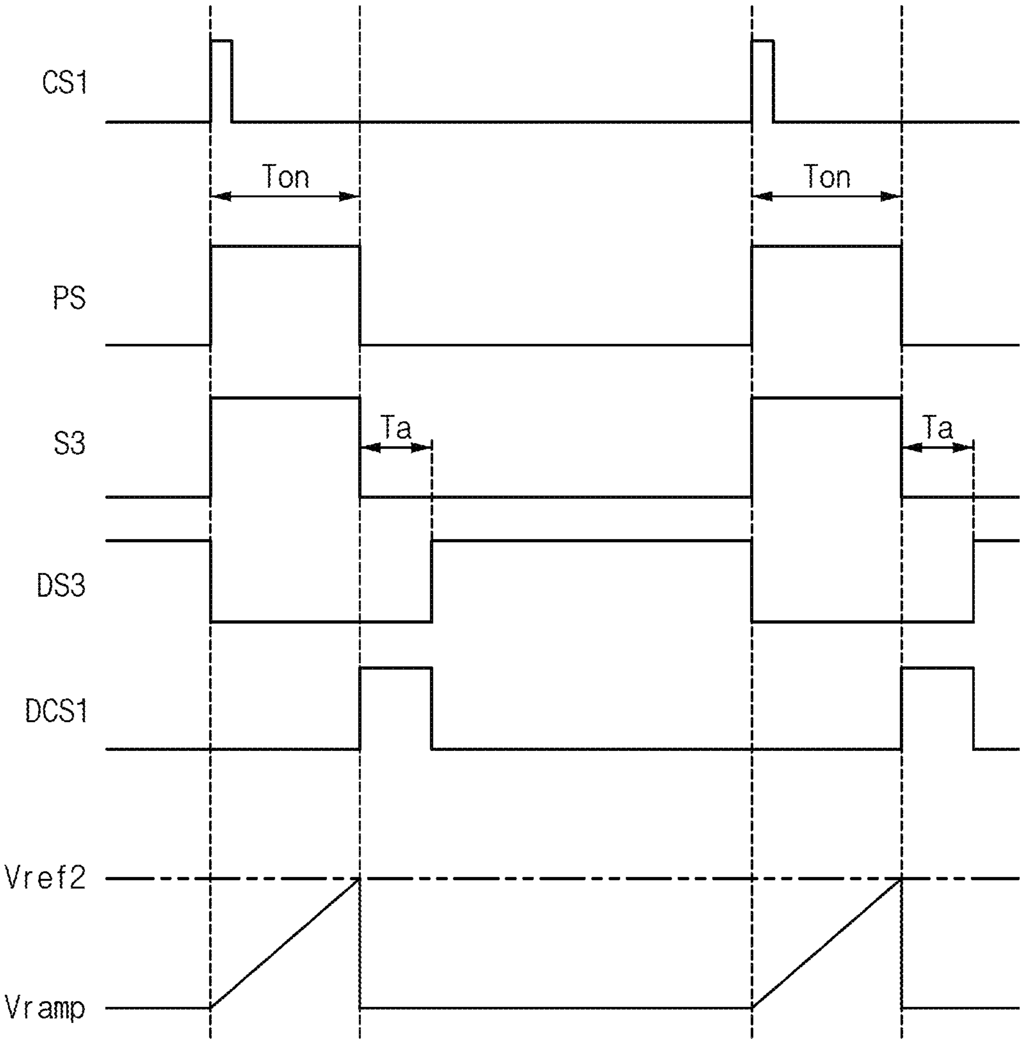
FIG. 7B is a diagram for describing an operation of a delay circuit in FIG. 2.

FIG. 7A is a circuit diagram illustrating an example of the delay circuit D1 in FIG. 2. FIG. 7B is a diagram for describing an operation of the delay circuit D1 in FIG. 2.

Referring to FIGS. 7A and 7B, a delay circuit 701 may include a flip-flop FF, a current source 71, a capacitor $C_2$, a comparator CP2, an SR latch L2 and a delay unit D2.

The delay circuit 701 of FIG. 7A and related operation illustrated in FIG. 7B may be substantially the same as the delay circuit 601 of FIG. 6A and related operation illustrated in FIG. 6B, except that a configuration of the current source 71 is changed. The descriptions repeated with or overlapping with descriptions of FIGS. 6A and 6B will be omitted in the interest of brevity.

Unlike the current source 61 in FIG. 6A, the current source 71 in FIG. 7A may generate a constant current $I_{BIAS}$ regardless of the input voltage Vin. For example, the delay time determined by the delay circuit 701 of FIG. 7A, e.g., an activation time interval Ton of the switching signal PS, may be fixed regardless of a change in the input voltage Vin.

As described with reference to the delay circuit 701 of FIG. 7A, a control scheme in which the activation time interval of the switching signal PS is fixed may be referred to as a constant on-time (COT) scheme.

Figure 8:
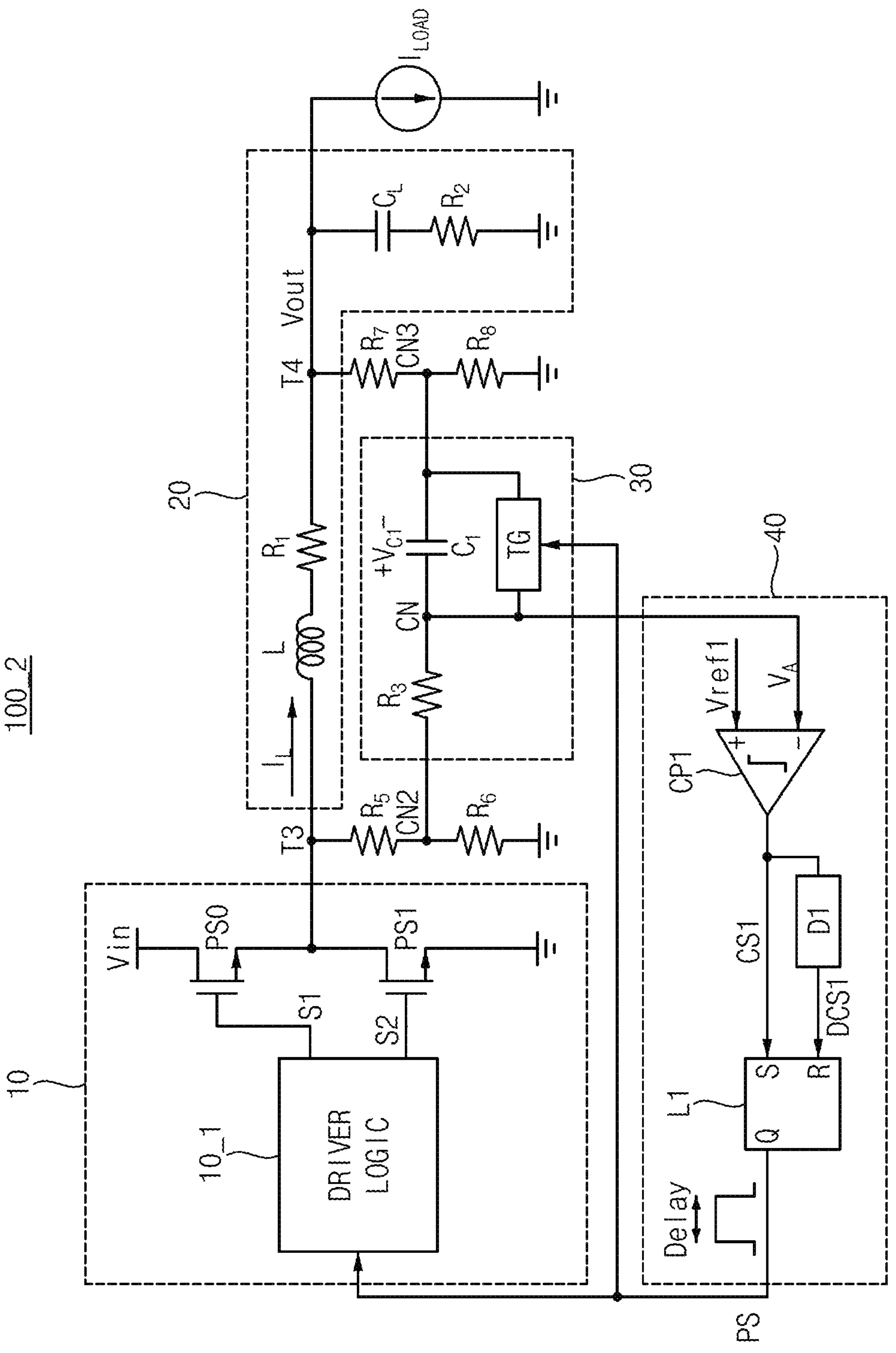
FIG. 8 is a circuit diagram illustrating a buck converter according to some example embodiments.

FIG. 8 is a circuit diagram illustrating a buck converter according to some example embodiments.

Referring to FIG. 8, a buck converter 100_2 may include the power switching circuit 10, the low pass filter 20, the sensing voltage generator 30 and the switching signal generator 40, and may further include resistors $R_5$, $R_6$, $R_7$ and $R_8$.

The buck converter 100_2 of FIG. 8 may be substantially the same as the buck converter 100_1 of FIG. 2, except that the buck converter 100_2 of FIG. 8 further includes the resistors $R_5$, $R_6$, $R_7$ and $R_8$. The descriptions repeated with or overlapping with descriptions of FIG. 2 will be omitted in the interest of brevity.

The resistors $R_5$ and $R_6$ may be connected in series between the output terminal T3 and the ground voltage Vss, and the resistors $R_7$ and $R_8$ may be connected in series between the second end of the inductor L and the ground voltage Vss. A first end of the third resistor $R_3$ may be connected to a common node CN2, which is commonly connected to the resistors $R_5$ and $R_6$, and a first end of the capacitor $C_1$ may be connected to a common node CN3, which is commonly connected to the resistors $R_7$ and $R_8$. For example, resistances of the resistors $R_5$, $R_6$, $R_7$ and $R_8$ may be substantially equal to each other.

The sensing voltage generator 30 included in the buck converter 100_2 may not be directly connected between the output terminal T3 and the second end of the inductor L (e.g., the feedback terminal T4), and may be connected at middle nodes (e.g., the common nodes CN2 and CN3) of resistor dividers (e.g., the resistors $R_5$, $R_6$, $R_7$ and $R_8$). The resistor dividers may be used to improve the withstand voltage characteristics of the switch TG connected in parallel with the resistor $R_3$.

Figure 9:
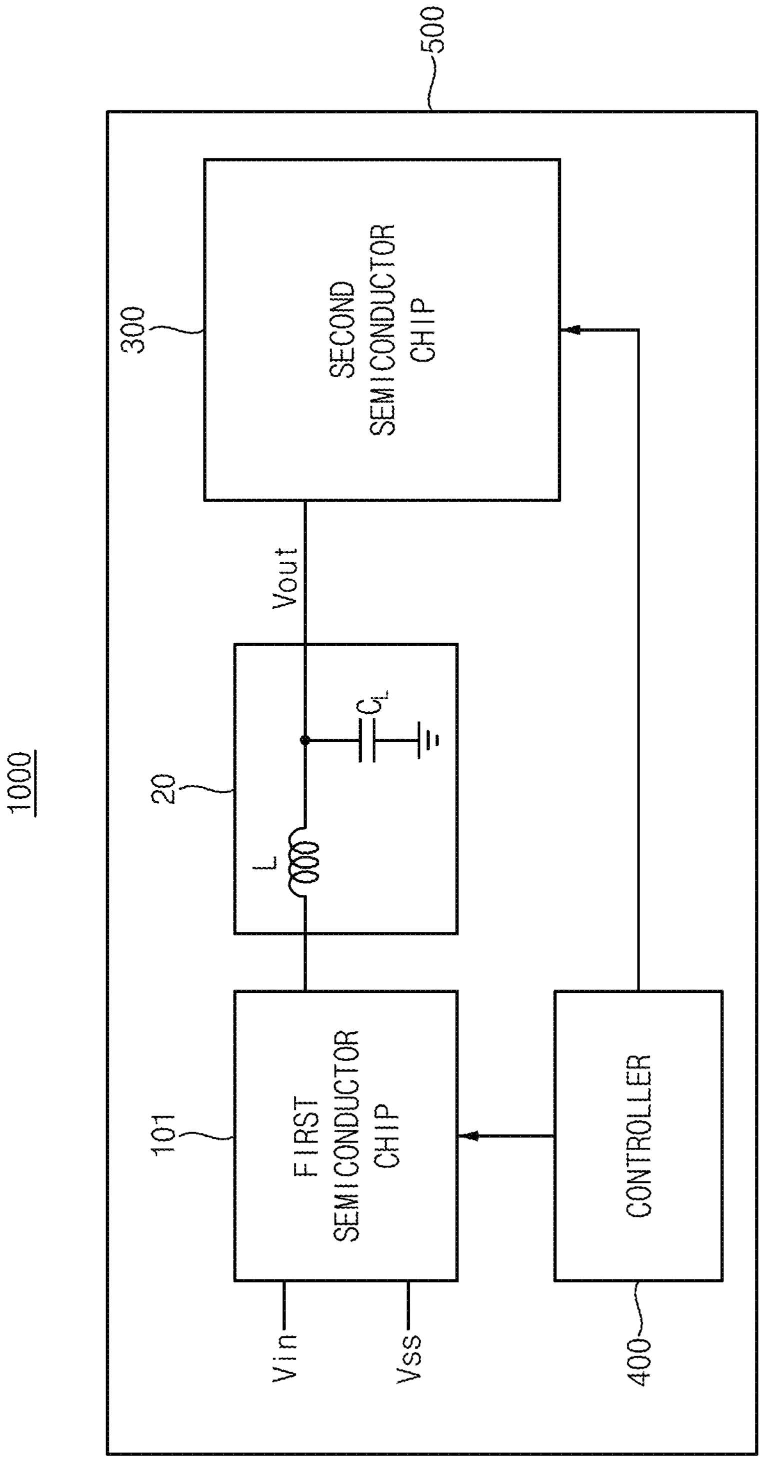
FIG. 9 is a block diagram illustrating an electronic device including a buck converter according to some example embodiments.

FIG. 9 is a block diagram illustrating an electronic device including a buck converter according to some example embodiments.

Referring to FIG. 9, an electronic device 1000 may include a first semiconductor chip 101, a second semiconductor chip 300 and a low pass filter 20, and may further include a printed circuit board (PCB) 500 on which the first semiconductor chip 101, the second semiconductor chip 300 and the low pass filter 20 are mounted.

The first semiconductor chip 101 and the low pass filter 20 may form the buck converter 100_1 of FIG. 2 and/or the buck converter 100_2 of FIG. 8. For example, the first semiconductor chip 101 may include the power switching circuit 10, the sensing voltage generator 30 and the switching signal generator 40. The power switching circuit 10 may receive the input voltage Vin from a battery (not illustrated), and may alternately transfer the input voltage Vin and the ground voltage Vss to the output terminal T3 in response to the switching signal PS having the activation time interval and the deactivation time interval. The sensing voltage generator 30 may generate the sensing voltage $V_A$. The switching signal generator 40 may generate the switching signal PS based on the sensing voltage $V_A$. The low pass filter 20 may generate the output voltage Vout by low-pass filtering a voltage at the output terminal T3. The second semiconductor chip 300 may receive the output voltage Vout as a power supply voltage, and may consume the load current $I_{LOAD}$. For example, the second semiconductor chip 300 may be or may include one of a memory or a central processing unit (CPU) with computational capability.

In some example embodiments, the first semiconductor chip 101 included in the electronic device 1000 may further include one of a linear regulator (e.g., low dropout (LDO) regulator) and a DC-DC converter having different type from the buck converter. The electronic device 1000 may further include a controller 400 that sets the buck converter to operate in either the AOT scheme or the COT scheme depending on an operating mode of the second semiconductor chip 300, which is a load device, (e.g., depending on the load current $I_{LOAD}$).

In the electronic device 1000 including the buck converter according to some example embodiments, a desired output voltage may be accurately generated within a relatively fast response time even if the load current changes rapidly. Accordingly, overall performance degradation of the electronic device 1000 may be limited and/or prevented.

Some example embodiments may be applied to various electronic devices and systems that include the buck converters. For example, some example embodiments may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an internet of things (IoT) device, an internet of everything (IoE) device, an e-book reader, a virtual reality (VR) device, an augmented reality (AR) device, a robotic device, a drone, an automotive, etc.

One or more of the elements disclosed above may include or be implemented in processing circuitry such as hardware including logic circuits; a hardware/software combination such as a processor executing software; or a combination thereof. For example, the processing circuitry may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, an application-specific integrated circuit (ASIC), etc.

The foregoing is illustrative of some example embodiments and is not to be construed as limiting thereof. Although some example embodiments have been described, those skilled in the art will readily appreciate that many modifications are possible without materially departing from the novel teachings and advantages of the example embodiments. Accordingly, all such modifications are intended to be included within the scope of example embodiments as defined in the claims. Therefore, it is to be understood that the foregoing is illustrative of some various example embodiments and is not to be construed as limited specifically to some example embodiments disclosed, and that modifications as well as other example embodiments, are intended to be included within the scope of the appended claims.

What is claimed is:

1. A buck converter comprising:

a power switching circuit configured to alternately transfer an input voltage and a ground voltage to an output terminal based on a switching signal;

a low pass filter including an inductor, the inductor having a first end connected to the output terminal and a second end connected to a load capacitor, the inductor configured to generate an output voltage at the second end;

a first resistor and a capacitor connected in series between the output terminal and the second end of the inductor;

a switch between a common node and the second end of the inductor, the common node being connected to the first resistor and the capacitor;

a comparator configured to generate a comparison signal by comparing a sensing voltage at the common node with a reference voltage; and an SR latch configured to receive the comparison signal as a set signal, receive a delay signal as a reset signal, and generate the switching signal based on the comparison signal and the delay signal, the delay signal being activated after the comparison signal is activated, wherein the switch is configured to electrically connect the common node and the second end of the inductor during an activation time interval of the switching signal.

2. The buck converter of claim 1, wherein the SR latch is configured to activate the switching signal in response to an activation of the comparison signal and then deactivate the switching signal in response to an activation of the delay signal.

3. The buck converter of claim 2, wherein the switch is configured to electrically disconnect the common node and the second end of the inductor during a deactivation time interval of the switching signal.

4. The buck converter of claim 3, wherein the switch includes a transmission gate.

5. The buck converter of claim 3, wherein during the activation time interval of the switching signal, a first voltage across the capacitor is 0V, and the sensing voltage at the common node is equal to the output voltage.

6. The buck converter of claim 3, wherein during the deactivation time interval of the switching signal, a first voltage across the capacitor is based on Equation 1 as follows:

$$V_{C1} = \frac{I_L R_1\left(1 + s\frac{L}{R_1}\right)}{(1 + sR_3C_1)} \quad \text{[Equation 1]}$$

wherein $I_L$ denotes an inductor current flowing through the inductor, $R_1$ denotes a resistance of an equivalent series resistor of the inductor, L denotes an inductance of the inductor, $R_3$ denotes a resistance of the first resistor, $C_1$ denotes a capacitance of the capacitor, and s denotes a LaPlace variable.

7. The buck converter of claim 6, wherein during the deactivation time interval of the switching signal, the sensing voltage is equal to a sum of the output voltage and the first voltage.

8. The buck converter of claim 7, wherein during the deactivation time interval of the switching signal, the first voltage changes to a voltage lower than 0V.

9. The buck converter of claim 3, wherein the comparator is configured to activate the comparison signal when the sensing voltage is equal to or lower than the reference voltage, and wherein the activation time interval of the switching signal is based on a delay time from when the comparison signal is activated to when the delay signal is activated.

10. The buck converter of claim 9, wherein the delay time is variable depending on a voltage level of the input voltage.

11. The buck converter of claim 9, wherein the delay time is fixed regardless of a change in the input voltage.

12. The buck converter of claim 3, wherein the power switching circuit includes:

a first power switch configured to transfer the input voltage to the output terminal during the activation time interval of the switching signal; and a second power switch configured to transfer the ground voltage to the output terminal during the deactivation time interval of the switching signal.

13. The buck converter of claim 1, wherein the power switching circuit, the switch, the comparator and the SR latch are included in a semiconductor chip, and wherein the inductor and the load capacitor are outside the semiconductor chip.

14. The buck converter of claim 1, further comprising:

a second resistor and a third resistor connected in series between the output terminal and the ground voltage; and a fourth resistor and a fifth resistor connected in series between the second end of the inductor and the ground voltage, wherein a first end of the first resistor is connected to a second common node, the second common node being connected to the second and third resistors, and wherein a first end of the capacitor is connected to a third common node, and the third common node being connected to the fourth and fifth resistors.

15. The buck converter of claim 14, wherein resistances of the second, third, fourth and fifth resistors are equal to each other.

16. A buck converter comprising:

a power switching circuit configured to alternately transfer an input voltage and a ground voltage to an output terminal based on a switching signal;

a low pass filter including an inductor, the inductor having a first end connected to the output terminal and a second end connected to a load capacitor, the inductor configured to generate an output voltage at the second end;

a first resistor and a first capacitor connected in series between the output terminal and the second end of the inductor;

a switch between a common node and the second end of the inductor, the common node being connected to the first resistor and the first capacitor;

a first comparator configured to generate a first comparison signal by comparing a sensing voltage at the common node with a first reference voltage;

a delay circuit configured to generate a delay signal by delaying the first comparison signal; and a first SR latch configured to receive the first comparison signal as a set signal, receive the delay signal as a reset signal, and generate the switching signal based on the first comparison signal and the delay signal, the first SR latch being configured to activate the switching signal when the first comparison signal is activated and deactivate the switching signal when the delay signal is activated, and wherein the switch is configured to electrically connect the common node and the second end of the inductor during an activation time interval of the switching signal, and to electrically disconnect the common node and the second end of the inductor during a deactivation time interval of the switching signal.

17. The buck converter of claim 16, wherein the delay circuit includes:

a current source configured to generate a first current proportional to the input voltage;

a second capacitor configured to generate a ramp voltage based on the first current from when the switching signal is activated;

a second comparator configured to generate a second comparison signal by comparing the ramp voltage with a second reference voltage; and a second SR latch configured to receive the second comparison signal as a second set signal, and to activate the delay signal based on the second comparison signal.

18. The buck converter of claim 17, wherein the delay circuit further includes:

a flip-flop configured to activate a first signal, wherein the delay circuit is configured responsive to the first signal to transfer the first current to the second capacitor from when the switching signal is activated until the delay signal is activated, and wherein the second SR latch is configured to deactivate the delay signal based on a second signal that is activated a time interval after the first signal is deactivated.

19. The buck converter of claim 18, wherein the delay circuit further includes at least one additional resistor or additional capacitor configured to determine when the first signal is deactivated and when the second signal is activated.

20. An electronic device comprising:

a first semiconductor chip including a power switching circuit configured to alternately transfer an input voltage and a ground voltage to an output terminal based on a switching signal having an activation time interval and a deactivation time interval, a sensing voltage generator configured to generate a sensing voltage, and a switching signal generator configured to generate the switching signal based on the sensing voltage;

an inductor and a load capacitor configured to generate an output voltage by low-pass filtering a voltage at the output terminal; and a second semiconductor chip configured to receive the output voltage as a power supply voltage, wherein during the activation time interval of the switching signal, the sensing voltage generator is configured to generate the sensing voltage as being equal to the output voltage, and wherein during the deactivation time interval of the switching signal, the sensing voltage generator is configured to generate the sensing voltage as being equal to a sum of the output voltage and a voltage reflecting a current flowing through the output terminal.

* * * * *